(12) United States Patent
Jiang

(10) Patent No.: US 9,959,362 B2
(45) Date of Patent: May 1, 2018

(54) CONTEXT-AWARE LANDING PAGE

(71) Applicant: Shan Jiang, Saratoga, CA (US)

(72) Inventor: Shan Jiang, Saratoga, CA (US)

(73) Assignee: SAP SE, Walldorf (DE)

( * ) Notice: Subject to any disclaimer, the term of this patent is extended or adjusted under 35 U.S.C. 154(b) by 702 days.

(21) Appl. No.: 14/446,171

(22) Filed: Jul. 29, 2014

(65) Prior Publication Data

US 2016/0034576 A1    Feb. 4, 2016

(51) Int. Cl.
*G06F 7/00* (2006.01)
*G06F 17/00* (2006.01)
*G06F 17/30* (2006.01)
*G06F 15/16* (2006.01)

(52) U.S. Cl.
CPC .... *G06F 17/30893* (2013.01); *G06F 17/3051* (2013.01); *G06F 17/30864* (2013.01)

(58) Field of Classification Search
CPC ........ G06F 17/30893; G06F 17/30864; G06F 17/3051
USPC ................................................. 707/770, 702
See application file for complete search history.

(56) References Cited

U.S. PATENT DOCUMENTS

| | | | | |
|---|---|---|---|---|
| 6,969,763 | B1* | 11/2005 | Ecker | C07H 21/04 536/24.3 |
| 8,533,761 | B1* | 9/2013 | Sahami | G06F 17/30864 725/51 |
| 8,850,315 | B1* | 9/2014 | Rogers | G06F 3/0481 715/706 |
| 2004/0210400 | A1* | 10/2004 | Konvicka | G06F 19/24 702/20 |
| 2005/0191731 | A1* | 9/2005 | Judson | G06F 19/18 435/104 |
| 2008/0059896 | A1* | 3/2008 | Anderson | G06F 3/0481 715/764 |
| 2008/0273218 | A1* | 11/2008 | Kitora | H04N 1/40062 358/1.13 |
| 2010/0146436 | A1* | 6/2010 | Jakobson | G06F 17/30864 715/800 |
| 2013/0041824 | A1* | 2/2013 | Gupta | G06Q 40/00 705/44 |
| 2013/0185670 | A1* | 7/2013 | Liu | G06Q 50/01 715/781 |
| 2013/0241952 | A1* | 9/2013 | Richman | G06F 17/30893 345/619 |
| 2014/0236953 | A1* | 8/2014 | Rapaport | G06Q 10/10 707/740 |
| 2014/0244429 | A1* | 8/2014 | Clayton | G06Q 30/0631 705/26.7 |

(Continued)

*Primary Examiner* — Usmaan Saeed
*Assistant Examiner* — Brian E. Weinrich
(74) *Attorney, Agent, or Firm* — Fountainhead Law Group P.C.

(57) ABSTRACT

Techniques are described for creating a context-aware landing page. A context-aware landing page is capable of dynamically updating its tiles to include content tiles which are related to a received triggering event. The triggering event can be received from a business context source. When the triggering event is received, a weighting table that contains a plurality of content tiles can be retrieved. The method can then select one or more content tiles to include in the context-aware landing page. The selection of the one or more content tiles can depend on the triggering event.

14 Claims, 6 Drawing Sheets

(56) References Cited

U.S. PATENT DOCUMENTS

| | | | |
|---|---|---|---|
| 2014/0365120 A1* | 12/2014 | Vulcano | G06F 17/30864 701/532 |
| 2015/0019262 A1* | 1/2015 | Du | G06Q 40/08 705/4 |
| 2016/0012541 A1* | 1/2016 | Harrington | G06Q 40/08 705/4 |

* cited by examiner

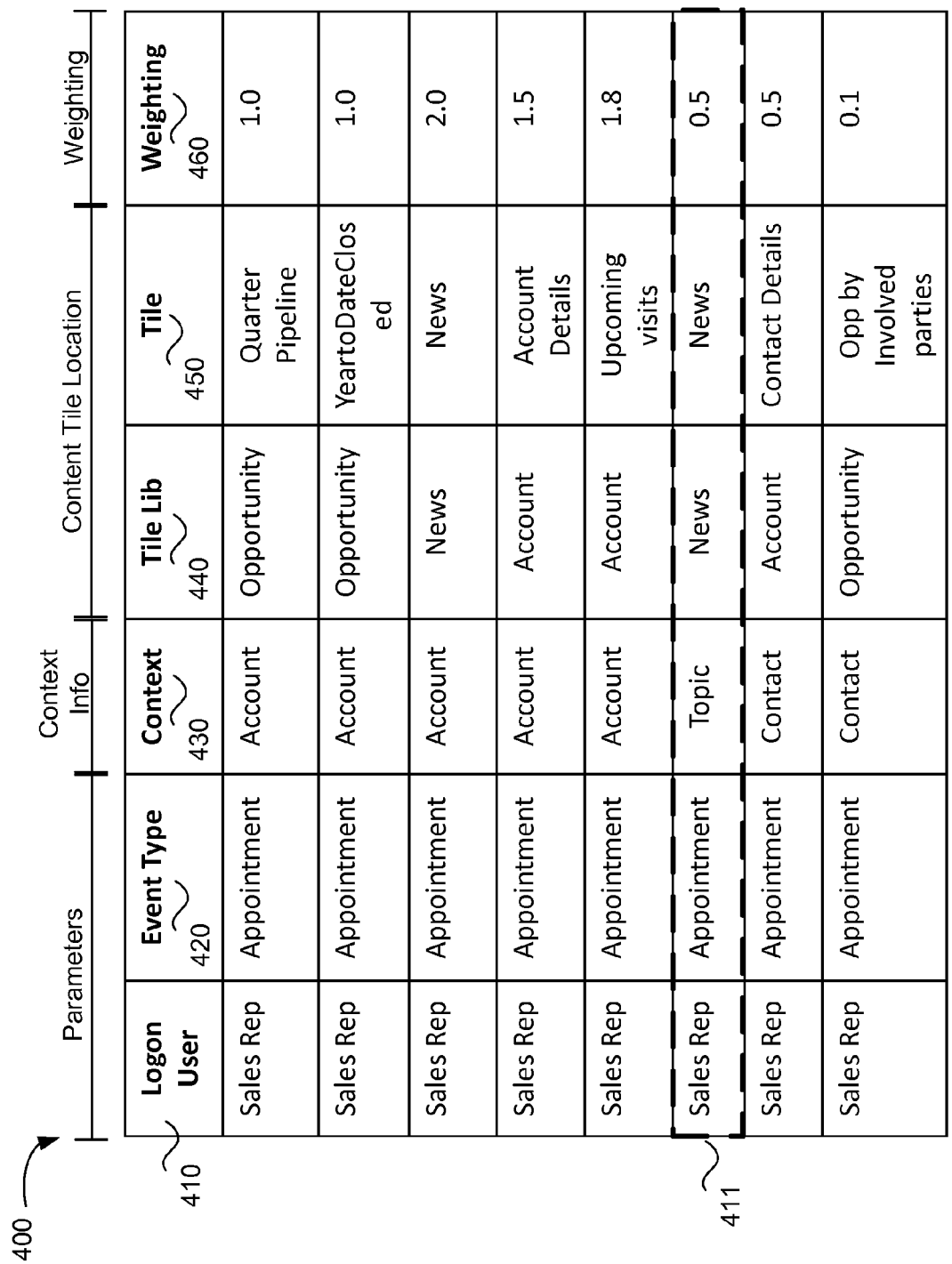

FIG. 4

| Parameters | | Context Info | Content Tile Location | | Weighting |
|---|---|---|---|---|---|
| Logon User 410 | Event Type 420 | Context 430 | Tile Lib 440 | Tile 450 | Weighting 460 |
| Sales Rep | Appointment | Account | Opportunity | Quarter Pipeline | 1.0 |
| Sales Rep | Appointment | Account | Opportunity | YeartoDateClosed | 1.0 |
| Sales Rep | Appointment | Account | News | News | 2.0 |
| Sales Rep | Appointment | Account | Account | Account Details | 1.5 |
| Sales Rep | Appointment | Account | Account | Upcoming visits | 1.8 |
| Sales Rep | Appointment | Topic | News | News | 0.5 |
| Sales Rep | Appointment | Contact | Account | Contact Details | 0.5 |
| Sales Rep | Appointment | Contact | Opportunity | Opp by Involved parties | 0.1 |

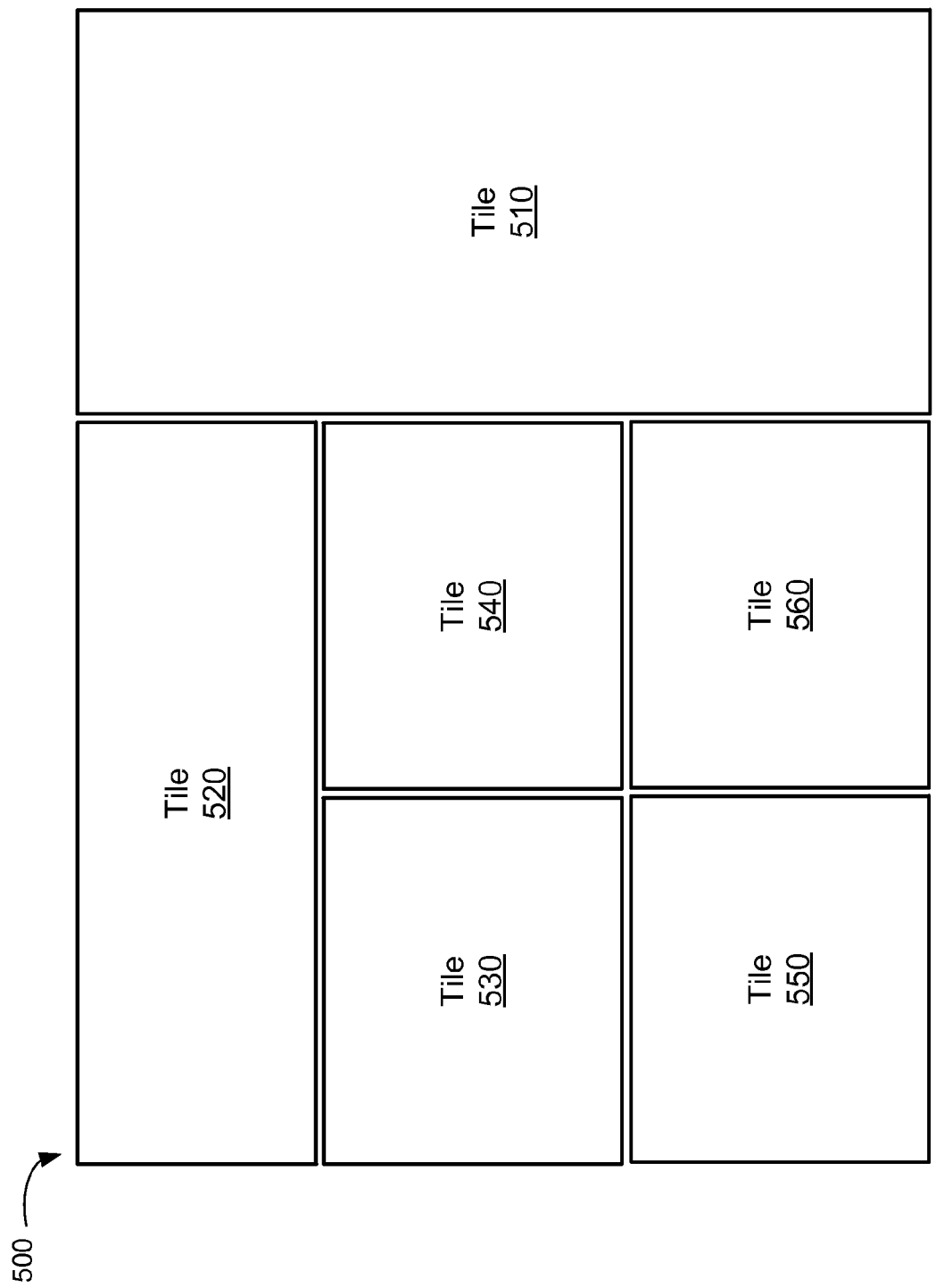

CONTEXT-AWARE LANDING PAGE

BACKGROUND

In today's business environment, a business user utilizes multiple business applications on a daily basis to perform various business functions. For instance, a typical business user can frequently access an email application, appointment application, and task application. To assist the business user in staying up to date on the various business applications, a monitoring application can monitor the status of these various business applications.

A monitoring application has a landing page user interface which consolidates information received from multiple business applications. The landing page can serve as a home page for the business user by providing an initial screen that presents information from the multiple business applications. Through the landing page, the business user can receive updates and retrieve information from the various business applications.

Traditionally, a business user customizes the landing page based on predefined user preferences of a user account. The landing page can be configured to present content that is of interest to the business user in multiple tiles. For example, user preferences can specify that a first tile having a resolution of 200×800 be positioned on the top left corner of the landing page and present year to date sales data. As a result, a unique landing page can be associated with each user account. However, this still requires the user to manually edit the landing page. As a result, the landing page is unable to dynamically adjust the type of content presented based on events received by the monitoring application from various business applications.

SUMMARY

In one embodiment, a computer-implemented method receives, by a processor, an event trigger configured to report an event, the event trigger containing at least one attribute that provides context to the event. The method then retrieves, by the processor, a weighting table that describes a plurality of content tiles that are associated with the event, wherein a content tile from the plurality of content tiles includes a weighting value configured to represent the significance of the content tile. Upon retrieving the weighting table, the method then selects, by the processor, a ranked list of content tiles from the weighting table to include in a landing page, wherein the ranked list includes the content tile and the position of the content tile in the ranked list is based on the weighting value. The method then generates, by the processor, the landing page with the ranked list of content tiles.

In one example, the method further subscribes, by the processor, to a business application to receive event triggers from the business application, wherein the event trigger was generated by the business application In another example, retrieving the weighting table can include determining, by the processor, a user profile that is currently active, identifying, by the processor, an event type that is associated with the event trigger, and retrieving, by the processor, the weighting table based on the user profile and the event type.

In another example, selecting the ranked list of content tiles can include identifying, by the processor, a condition of the content tile, the condition specifying a parameter used to query for content related to the content tile, determining, by the processor, that the condition is satisfied by the at least one attribute of the triggering event, and including, by the processor, the content tile as part of the ranked list of content tiles based on the determination.

In another example, generating the landing page can include identifying, by the processor, a tile in the landing page having the largest area, and assigning, by the processor, the content tile to the tile when the weighting value of the content tile is greater than the weighting value of content tiles in the ranked list.

In another example, the method further receives, by the processor, an input representative of deleting the content tile from the landing page and adjusts, by the processor, the weighting value of the content tile in response to the input.

In another example, the method further receives, by the processor, an input representative of interacting with the content tile from the landing page and adjusts, by the processor, the weighting value of the content tile in response to the input.

In another embodiment, a non-transitory computer readable storage medium stores one or more programs comprising instructions for receiving an event trigger configured to report an event, the event trigger containing at least one attribute that provides context to the event, retrieving a weighting table that describes a plurality of content tiles that are associated with the event, wherein a content tile from the plurality of content tiles includes a weighting value configured to represent the significance of the content tile, selecting a ranked list of content tiles from the weighting table to include in a landing page, wherein the ranked list includes the content tile and the position of the content tile in the ranked list is based on the weighting value, populating the content tile with content, and generating the landing page that contains the content tile.

In another embodiment, a computer implemented system comprises one or more computer processors and a non-transitory computer-readable storage medium. The non-transitory computer-readable storage medium comprises instructions, that when executed, control the one or more computer processors to be configured for receiving an event trigger configured to report an event, the event trigger containing at least one attribute that provides context to the event, retrieving a weighting table that describes a plurality of content tiles that are associated with the event, wherein a content tile from the plurality of content tiles includes a weighting value configured to represent the significance of the content tile, selecting a ranked list of content tiles from the weighting table to include in a landing page, wherein the ranked list includes the content tile and the position of the content tile in the ranked list is based on the weighting value, populating the content tile with content, and generating the landing page that contains the content tile.

The following detailed description and accompanying drawings provide a better understanding of the nature and advantages of the present disclosure.

BRIEF DESCRIPTION OF THE DRAWINGS

FIG. 4 illustrates a weighting table according to one embodiment;

FIG. 5 illustrates a landing page according to one embodiment; and

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Disclosed herein are techniques for providing a context-aware landing page to the business user. A context-aware landing page dynamically updates the type of content being presented in response to triggering events that are received from various business context sources. When a triggering event is received from a business context source, the monitoring application processes the triggering event to update the landing page with one or more content tiles that are associated with the triggering event. Each content tile can present a type of content to the user. Thus, the monitoring application dynamically updates the content tiles being presented on the landing page based on the triggering event. In some embodiments, the monitoring application can identify a weighting table that corresponds with the triggering event. The weighting table is subsequently used by the monitoring application to select content tiles to update the landing page. The weighting table includes multiple content tiles that are each capable of presenting a type of content associated with the triggering event. Each content tile can be assigned a weighting value. During runtime, the monitoring application can utilize the weighting table to update the landing page. In some embodiments, the content tiles in a weighting table can be associated with a weighting value which is used by the monitoring application to select the content tiles of the landing page. The weighting value of a content tile can periodically be updated based on received user input. For example, the weighting value of a content tile can be decreased when input representative of removing the content tile is received. Similarly, the weighting value of the content tile can be increased when input representative of interacting with the content tile is received.

Figure 1:
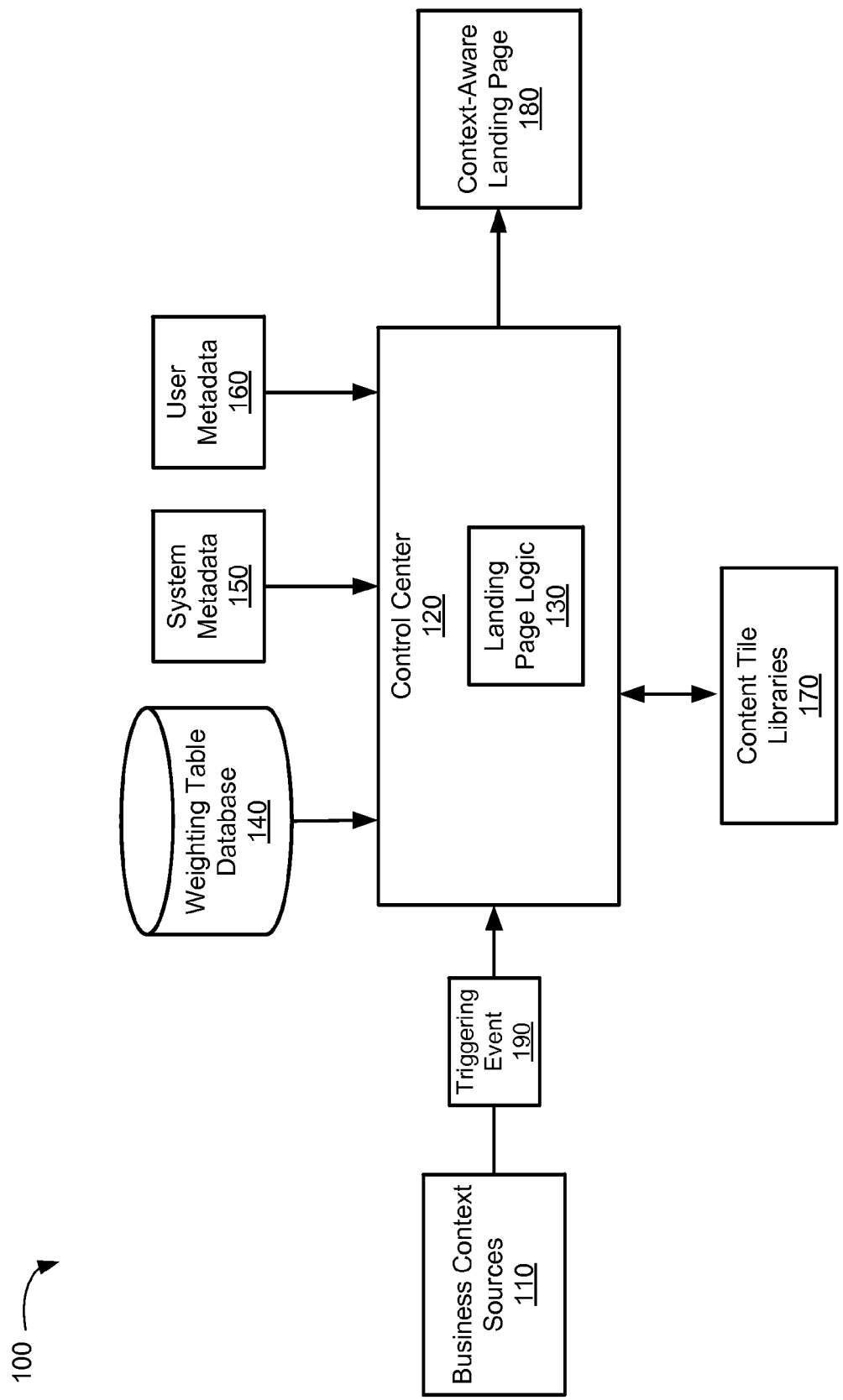
FIG. 1 illustrates a system according to one embodiment.

FIG. 1 illustrates a system according to one embodiment. System 100 is configured to generate or update a context-aware landing page in response to a triggering event. In one embodiment, system 100 can automatically generate the landing page in response to receiving the triggering event. In another embodiment, system 100 can present on the landing page a notification when the triggering event is received. Upon detecting user input representative of selecting the notification, system 100 can generate the landing page to display content related to the triggering event. Depending on implementation details, the generated landing page can update an existing landing page, replace an existing landing page, or initialize a landing page.

System 100 includes control center 120. Control center 120 is part of the monitoring application and is configured to receive triggering event 190 from business context sources 110. Business context sources 110 can include applications that are in communication with the monitoring application. Business context sources 110 can also include measurements generated by the monitoring application, such as time information, temperature information, location information, etc. measured by the monitoring application. In one example, the business context source can be a business application configured to provide analysis on a business. In another example, a business context source can be an appointment application configured to manage appointments of the business user. In yet another example, the business context source can be an email application configured to provide email services to the business user. In yet another example, the business context source can be a location service that provides a notification when the business user is within a geographical location. In yet another example, the business context source can be a troubleshooting application configured to provide analysis for troubleshooting issues. In yet another example, the business context source can be a tasks application configured to manage tasks assigned to the business user. In some examples, control center 120 can subscribe to business context sources. Subscribing to business context sources allows control center 120 to receive triggering events to control center 120. Alternatively, subscribing to a business context source can cause control center 120 to monitor the subscribed business context source for triggering events.

Control center 120 includes landing page logic 130. Landing page logic 130 is configured to generate or update the context-aware landing page 180 based on triggering event 190. Landing page logic 130 may communicate with weighting table database 140 to retrieve a weighting table as part of generating context-aware landing page 180. Landing page 130 may also communicate with content tile library 170 to retrieve content tiles based on triggering event 190. In some examples, landing page logic 130 can also utilize system metadata 150 (which includes location information, date information, and other measured information) or user metadata 160 (such as the business user's business role or the business user's responsible areas) while generating context-aware landing page 180.

Figure 2:
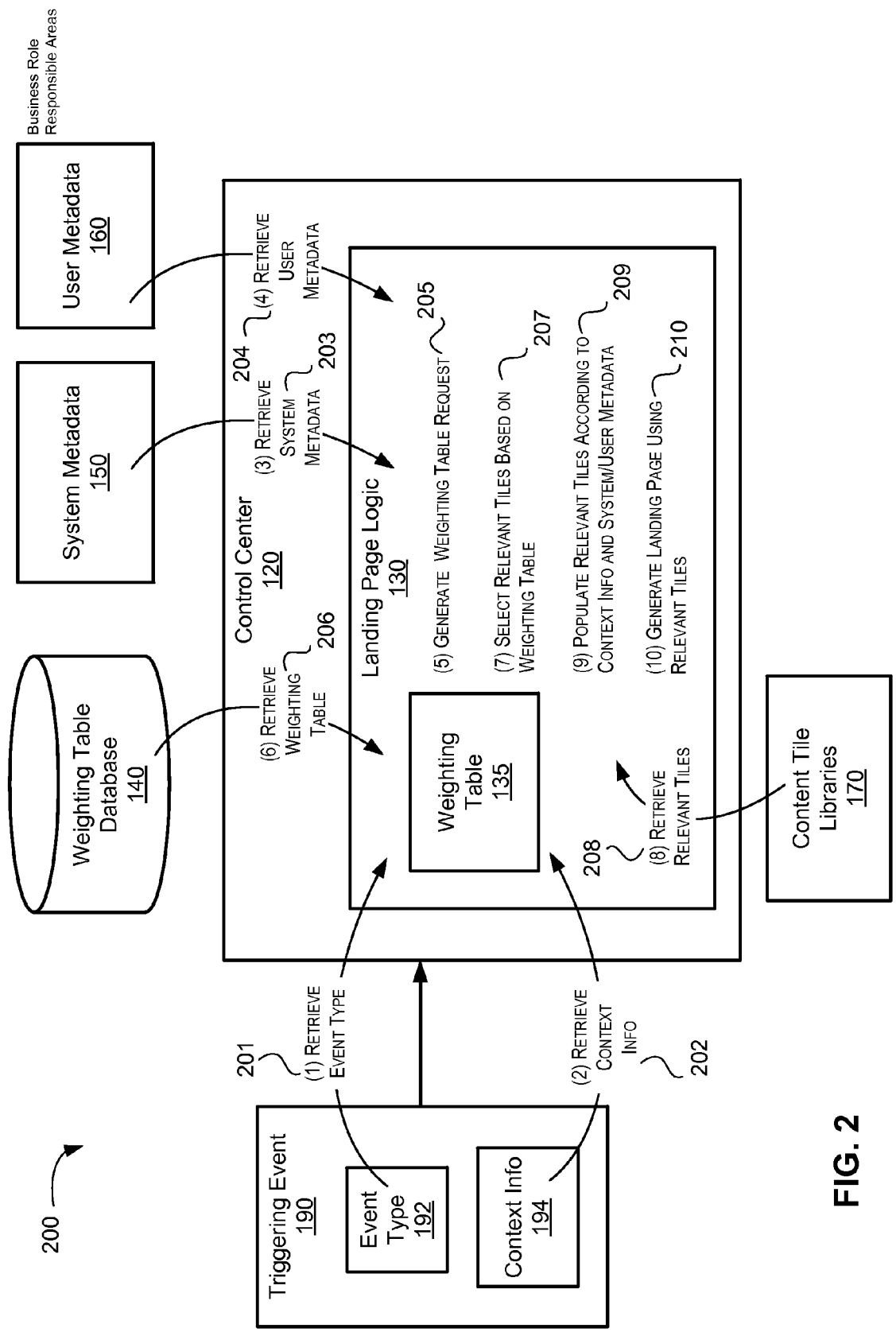
FIG. 2 illustrates a workflow for generating a landing page according to one embodiment.

FIG. 2 illustrates a workflow for generating a landing page according to one embodiment. Steps 1-9 can be performed by landing page logic 130 or by a combination of landing page logic 130 and other logic within control center 120. Workflow 200 begins at step 1 (reference numeral 201) by retrieving event type 192 from triggering event 190. As discussed above, triggering event 190 can be received from a business context source, such as an application in communication with control center 120 or measured data available to control center 120. Here, triggering event 190 includes event type 192 and context information 194. Event type 192 can describe the type of event that generated triggering event 190. For example, the type of event can be an appointment from an appointment application, a task from a task application, an email from an email application, or a warning from an auditing application that snoops for warnings. Workflow 200 continues at step 2 (reference numeral 202) by retrieving context information 194 from triggering event 190. Context information 194 can include data that provides context to triggering event 190. For example if event type 192 is an appointment, context information can include data such as the attendees of the appointment, the time of the appointment, and discussion topics for the appointment.

Workflow 200 continues to step 3 (reference numeral 203) by retrieving system metadata 150 and to step 4 (reference numeral 204) by retrieving user metadata 160. User metadata 160 can include a unique identifier for the user account that is currently logged into the monitoring application or alternatively can be a generic identifier used by a group of user accounts who are related (e.g., belong to the same group in an organization or have the same business role within the organization). System metadata 150 can include time information, location information, temperature information, and other measured or calculated information that is available to control center 120. In some examples, system metadata 150 can come from a source other than the business context sources.

Workflow 200 continues to step 5 (reference numeral 205) by generating a weighting table request for retrieving a weighting table from weighting table database 140. The weighting table request can combine one or more of event type 192, context information 194, system metadata 150 and user metadata 160. In one example, the weighting table request can include event type 192 that describes the type of event and user metadata 160. Workflow 200 continues to step 6 (reference numeral 206) by retrieving weighting table 135 from weighting table database 140 according to the generated weighting table request.

Weighting table 135 can be configured to provide a list of content tiles which are relevant to triggering event 190. Each content tile is configured to present a type of data to the user. For example, a content tile can be configured to account details to the user while another content tile can be configured to present contact details to the user. In some embodiments, each content tile in weighting table 135 can include a weighting value. The weighting value of a content tile can represent the significance of the content tile to weighting table 135. In one example, weighting table 135 can be assigned to a user or a user group. As a result, the weighting values in weighting table 135 can represent the preferences of the user or user group. Content tiles having a higher weighting value are more significant to the user or user group.

Once weighting table 135 has been retrieved, workflow 200 continues by selecting relevant content tiles from weighting table 135 to include in the landing page at step 7 (reference numeral 207). In one embodiment, relevant content tiles can be selected from weighting table 135 according to the weighting values which have been assigned to each content tile in weighting table 135. For example, a predefined number of relevant content tiles can be selected from weighting table 135 according to the weighting value. Content tiles with higher weighting values can selected before content tiles with lower weighting values. The predefined number can be the number of content tiles that will be in the landing page. This can be defined by the user or based on the number of existing tiles in the landing page. In some examples, a buffer can be added to the predefined number (e.g., an extra two or three content tiles) to account for relevant content tiles which have no content to present.

In another embodiment, workflow 200 can select content tiles based on a combination of the weighting values and other information available to landing page logic 130. Typically, the landing page logic can perform queries to retrieve content to present in the content tiles. The queries are based on the information previously retrieved, which can include context information 194, system metadata 150, or user metadata 160. For example, landing page logic can perform a query using the location information from system metadata 150 and the meeting place for an appointment from context information to retrieve content to present on a content tile. If the information previously retrieved does not contain the data to perform a query for content to present in a content tile, then the content tile can remain empty. Empty content tiles can be removed from the landing page. Landing page logic can take into consideration the information previously retrieved when selecting content tiles to ensure that queries for content can be performed for the selected content tiles. For example, weighting table 135 can include a content tile having a high weighting value. Workflow 200 may discover that the context information provided in the triggering event is insufficient to perform a query to retrieve content to populate the content tile and thus not select the content tile even though it has a high weighting value.

In yet another embodiment, landing page logic 130 can map each content tile in weighting table 135 to one or more conditions. Each condition can specify a data field in context information 194, system metadata 150, or user metadata 160 that is used to perform a query to populate the content tile with content. Landing page logic 130 can iterate through the content tiles in weighting table 135 according to their weighting value to select a predefined number of content tiles which have their conditions fully met. In one example, landing page logic 130 can determine that a condition of a content tile has been satisfied since context information 194 stored in triggering event 190 includes account information. In another example, landing page logic 130 can determine that a condition of another content tile is satisfied because system metadata 150 includes location information. With the location information, landing page logic 130 can query for content to present in the content tile. In yet another example, landing page logic 130 can determine that a condition of another content tile has been satisfied since a business role from user metadata 160 has been set to salesperson. This allows landing page logic 130 to limit the use of the content tile to salespersons. In yet other examples, landing page logic 130 can take into consideration one or more of these conditions when selecting a content tile.

After the relevant content tiles have been selected, workflow 200 can continue to step 8 (reference numeral 208) by retrieving the relevant content tiles from content tile libraries 170. Workflow 200 can then continue to step 9 (reference numeral 209) by populating the relevant content tiles with content according to context information, system metadata, and user metadata. In one embodiment, landing page logic 130 can query business context sources for the information to populate the relevant content tiles with content. For example, landing page logic 130 can transmit queries for data to business context sources or other databases of information for content to present in the relevant content tiles. Relevant content tiles which do not have any information to present can be removed.

Once relevant content tiles have been populated with information, workflow 200 can continue to step 10 (reference numeral 210) by generating the landing page using the relevant content tiles which have been populated with content. If the landing page is being updated from an existing landing page, then landing page logic 130 can determine the number of tiles in the existing landing page. If the number of relevant content tiles does not match the number of tiles in the existing landing page, then landing page logic 130 can add new tiles (or remove tiles) and resize the existing tiles so that each relevant content tile can be displayed on the landing page. Alternatively, landing page logic 130 can replace one or more tiles in the existing landing page with relevant content tiles. In the situation where there are relevant content tiles which are not being displayed on the landing page, landing page logic can cycle through the relevant content tiles by periodically replacing a displayed relevant content tile with an un-displayed relevant content tile. For example if a relevant content tile is not being displayed on the landing page, the relevant content tile can take the place of another content tile on the landing page. This change can be on a predefined interval.

Figure 3:
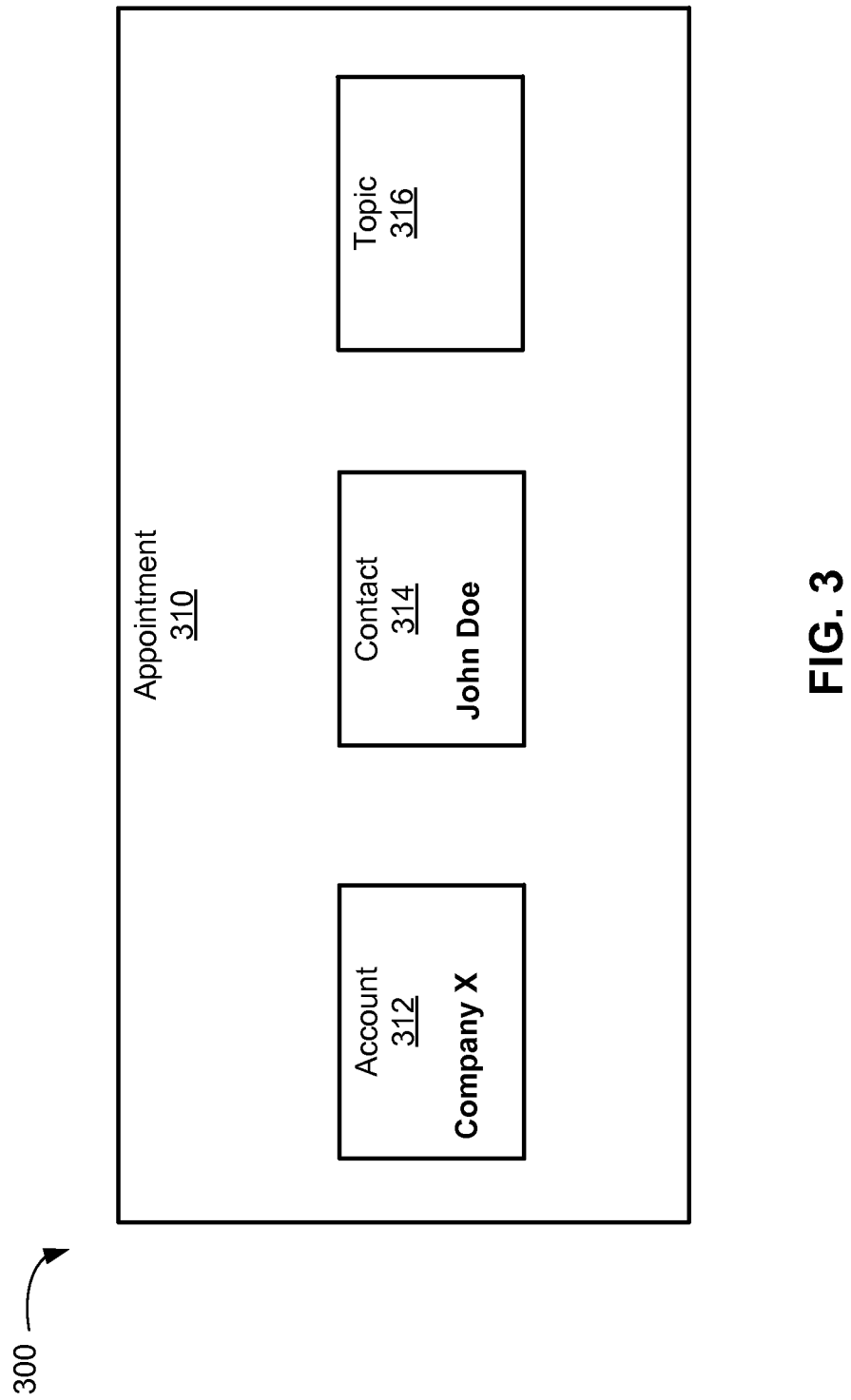
FIG. 3 illustrates a triggering event according to one embodiment.

FIG. 3 illustrates a triggering event according to one embodiment. As shown here, triggering event 300 includes event type 310. Event type 310 defines triggering event 310 as an appointment event. Thus, the triggering event was generated by an appointment business application. In other examples, the event type can be other business context sources such as email applications, measurement applications, business applications, etc. Triggering event 300 includes multiple fields which can store context information. The fields include account 312, contact 314, and topic 316. As shown here, triggering event 300 has account 312 set to "Company X," contact 314 set to "John Doe," and topic 316 left empty.

FIG. 4 illustrates a weighting table according to one embodiment. Weighting table 400 can be a relational database table having cells arranged in a plurality of columns and rows. Each row represents a content tile in weighting table 400 and each column represents an attribute of a content tile. Column 410 stores the role of the logon user who is utilizing the monitoring application. Column 420 stores the event type that is associated with a triggering event which is causing the landing page to be updated. Column 430 stores the context information that is related to the content tile. For example, a first content tile may be related to account information while second content tile may be related to a topic for discussion while a third content tile may be related to contact information. Column 440 stores the content tile library where the content tile can be found. Column 450 stores an identifier to locate the content tile within the content tile library specified in column 440. Column 460 stores a weighting value that is associated with the content tile. The weighting value can define the relevance of the content tile. A content tile with a low weighting value has a lower priority of being included as part of the landing page while a content tile with a high weighting value has a higher priority of being included as part of the landing page. As shown here, weighting table 400 includes row 411 for a content tile related to a topic of discussion. However since the triggering event 300 does not have context for topic field 316, this content tile is not relevant and will not be included in the landing page.

In one embodiment, the weighting value that is associated with the content tile can dynamically change in response to user input. In one example, landing page logic can reduce the weighting value associated with a content tile when input representative of a request to remove the content tile from the landing page is received. Removing a content tile from the landing page implies that the content tile is insignificant to the user. As a result, the weighting value can be reduced by a predefined value, reduced by a predefined percentage, or reduced using some other mathematical equation. In another example, landing page logic can increase the weighting value associated with a content tile when input representative of a request to interact with the content tile presented in the landing page is received. A user interacting with the content tile can imply that the content tile is significant or of interest to the user. As a result, the weighting value of the content tile can be increased, thus increasing the likelihood that the content tile is included in future updates of the landing page. For instance, the weighting value can be increased by a predefined value, increased by a predefined percentage, or increased using some other mathematical equation. These changes to the weighting value can be confined to the weighting table. In other words, changes to a weighting value associated with a content tile in the weighting table do not propagate to other weighting tables. This allows a user's preferences to stay confined with the user's (or the user group which the user belongs to) weighting table and not affect the weighting tables that correspond with other users.

FIG. 5 illustrates a landing page according to one embodiment. As shown, landing page 500 includes six tiles, tiles 510, 520, 530, 540, 550, and 560. The size and configuration of the tiles can be preconfigured from an existing landing page or from user preferences. Tile 510 is the largest tile, followed by tile 520. Tiles 530, 540, 550, and 560 are approximately the same size and shape. As landing page logic generates the landing page, content tiles which have been selected as having a high relevance (based on the weighting value) can be placed within the tiles on landing page 500.

In one embodiment, landing page logic can populate the landing page with relevant content tiles which have been populated with content. If there are more content tiles than there are tiles in the landing page, the landing page logic can cycle through the content tiles so that each content tile is presented for approximately the same amount of time. In another embodiment, landing page logic can assign content tiles to tiles based on their associated weighting value. For example, a content tile having the highest weighting value can be placed on tile 510, which is the largest tile in landing page 500. This allows content tiles of higher importance to be placed in tiles which are larger in size and thus, more prominent to the user.

In one embodiment, the contents of a tile in landing page 500 can be replaced with other content when input representative of removing a tile is received. The input can be a touch and drag operation performed on a tile within landing page 500. For example, selecting tile 540 and dragging tile 540 outside of landing page 500 can represent that the user wishes to remove the contents of tile 540 from landing page 500. As a result, landing page logic can replace the contents of tile 540 with contents from another content tile from the weighting table. In some examples, removing a content tile from landing page 500 can cause the other content tiles to occupy different tiles of landing page 500. For example, removing the content tile from tile 510 can cause the content tile that was occupying tile 520 to move to tile 510 since the content tile previously occupying tile 520 is now the content tile with the highest weighting value. As discussed above, removing a content tile from landing page 500 can result in a reduction to the weighting value associated with the content tile.

Figure 6:
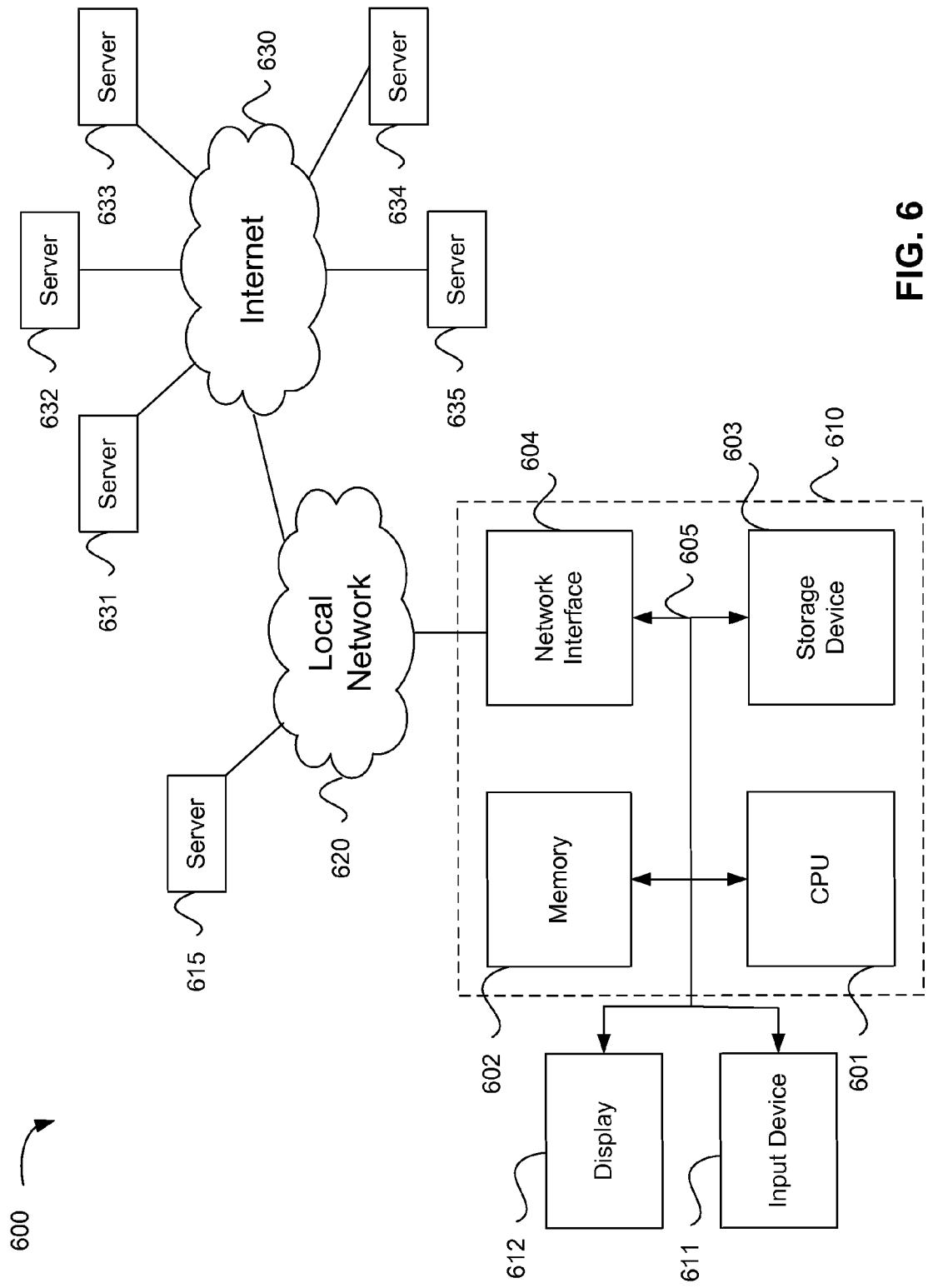
FIG. 6 illustrates an exemplary computer system according to one embodiment.

An exemplary computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, by a processor, an event trigger configured to report an event, the event trigger containing at least one attribute that provides context to the event;
    retrieving, by the processor, a weighting table corresponding to a logon user that describes a plurality of content tiles that are associated with the event, wherein a content tile from the plurality of content tiles includes a weighting value of a first weighting table column configured to represent the significance of the content tile, a second weighting table column identifies a library of the content tile, a third weighting table column provides a role of the logon user, and a fourth weighting table column provides an identifier to locate the content tile within the library;
    selecting, by the processor, a ranked list of content tiles from the weighting table to include in a landing page, wherein the ranked list includes the content tile and the position of the content tile in the ranked list is based on the weighting value, and wherein selecting the ranked list of content tiles comprises,
        identifying, by the processor, a condition of the content tile, the condition specifying a parameter used to query for content related to the content tile,
        determining, by the processor, that the condition is satisfied by the at least one attribute of the triggering event, and
        including, by the processor, the content tile as part of the ranked list of content tiles based on the determination;
    generating, by the processor, the landing page with the ranked list of content tiles retrieved from the library;
    receiving, by the processor, an input from the logon user representative of interacting with the content tile from the landing page;
    adjusting, by the processor, the weighting value of the content tile in the weighting table in response to the input, without propagating the weighting value to another weighting table corresponding to a different role of the logon user; and
    displaying on a changed landing page, another content tile replacing a size and a position of the content tile.

2. The computer-implemented method of claim 1, further comprising subscribing, by the processor, to a business application to receive event triggers from the business application, wherein the event trigger was generated by the business application.

3. The computer-implemented method of claim 1, wherein retrieving the weighting table comprises:
    determining, by the processor, a user profile that is currently active;
    identifying, by the processor, an event type that is associated with the event trigger; and
    retrieving, by the processor, the weighting table based on the user profile and the event type.

4. The computer-implemented method of claim 1, wherein generating the landing page comprises:
    identifying, by the processor, a tile in the landing page having the largest area; and
    assigning, by the processor, the content tile to the tile when the weighting value of the content tile is greater than the weighting value of content tiles in the ranked list.

5. The computer-implemented method of claim 1, further comprising:
    receiving, by the processor, the input representative of deleting the content tile from the landing page; and
    adjusting, by the processor, the weighting value of the content tile in response to the input.

6. A non-transitory computer readable storage medium storing one or more programs, the one or more programs comprising instructions for:
    receiving an event trigger configured to report an event, the event trigger containing at least one attribute that provides context to the event;
    retrieving a weighting table corresponding to a logon user that describes a plurality of content tiles that are associated with the event, wherein a content tile from the plurality of content tiles includes a weighting value of a first weighting table column configured to represent the significance of the content tile, a second weighting table column identifies a library of the content tile, a third weighting table column provides a role of the logon user, and a fourth weighting table column provides an identifier to locate the content tile within the library;

selecting a ranked list of content tiles from the weighting table to include in a landing page, wherein the ranked list includes the content tile and the position of the content tile in the ranked list is based on the weighting value, and wherein selecting the ranked list of content tiles comprises, identifying a condition of the content tile, the condition specifying a parameter used to query for content related to the content tile, determining that the condition is satisfied by the at least one attribute of the triggering event, and including the content tile as part of the ranked list of content tiles based on the determination;

populating the content tile with content;

generating the landing page that contains the content tile retrieved from the library;

receiving an input from the logon user representative of deleting the content tile from the landing page;

adjusting the weighting value of the content tile in the weighting table in response to the input, without propagating the weighting table to another weighting table corresponding to a different role of the logon user; and displaying on a changed landing page, another content tile replacing a size and a position of the content tile.

7. The non-transitory computer readable storage medium of claim 6, further comprising subscribing to a business application to receive event triggers from the business application, wherein the event trigger was generated by the business application.

8. The non-transitory computer readable storage medium of claim 6, wherein retrieving the weighting table comprises:

determining a user profile that is currently active;

identifying an event type that is associated with the event trigger; and retrieving the weighting table based on the user profile and the event type.

9. The non-transitory computer readable storage medium of claim 6, wherein generating the landing page comprises:

identifying a tile in the landing page having the largest area; and assigning the content tile to the tile when the weighting value of the content tile is greater than the weighting value of content tiles in the ranked list.

10. The non-transitory computer readable storage medium of claim 6, further comprising:

receiving the input representative of deleting the content tile from the landing page; and adjusting the weighting value of the content tile in response to the input.

11. A computer implemented system, comprising:

one or more computer processors; and a non-transitory computer-readable storage medium comprising instructions, that when executed, control the one or more computer processors to be configured for:

receiving an event trigger configured to report an event, the event trigger containing at least one attribute that provides context to the event;

retrieving a weighting table corresponding to a logon user that describes a plurality of content tiles that are associated with the event, wherein a content tile from the plurality of content tiles includes a weighting value of a first weighting table column configured to represent the significance of the content tile, a second weighting table column identifies a library of the content tile, a third weighting table column provides a role of the logon user, and a fourth weighting table column provides an identifier to locate the content tile within the library;

selecting a ranked list of content tiles from the weighting table to include in a landing page, wherein the ranked list includes the content tile and the position of the content tile in the ranked list is based on the weighting value, and wherein selecting the ranked list of content tiles comprises, identifying a condition of the content tile, the condition specifying a parameter used to query for content related to the content tile, determining that the condition is satisfied by the at least one attribute of the triggering event, and including the content tile as part of the ranked list of content tiles based on the determination;

populating the content tile with content;

generating the landing page that contains the content tile retrieved from the library;

receiving an input from the logon user representative of deleting the content tile from the landing page;

adjusting the weighting value of the content tile in response to the input, without propagating the weighting value to another weighting table corresponding to a different role of the logon user; and displaying on a changed landing page, another content tile replacing a size and a position of the content tile.

12. The computer implemented system of claim 11, further comprising subscribing to a business application to receive event triggers from the business application, wherein the event trigger was generated by the business application.

13. The computer implemented system of claim 11, wherein retrieving the weighting table comprises:

determining a user profile that is currently active;

identifying an event type that is associated with the event trigger; and retrieving the weighting table based on the user profile and the event type.

14. The computer implemented system of claim 11, wherein generating the landing page comprises:

identifying a tile in the landing page having the largest area; and assigning the content tile to the tile when the weighting value of the content tile is greater than the weighting value of content tiles in the ranked list.

\* \* \* \* \*